(12) United States Patent
Weingaertner

(10) Patent No.: US 11,063,283 B2
(45) Date of Patent: Jul. 13, 2021

(54) SOLID OXIDE FUEL CELL SYSTEM CONFIGURED FOR HIGHER HYDROCARBON FUELS

(71) Applicant: BLOOM ENERGY CORPORATION, Sunnyvale, CA (US)

(72) Inventor: David Weingaertner, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 156 days.

(21) Appl. No.: 16/202,982

(22) Filed: Nov. 28, 2018

(65) Prior Publication Data

US 2020/0168935 A1 May 28, 2020

(51) Int. Cl.
| | |
|---|---|
| *H01M 8/06* | (2016.01) |
| *H01M 8/0612* | (2016.01) |
| *H01M 8/04119* | (2016.01) |
| *H01M 8/04828* | (2016.01) |
| *H01M 8/04701* | (2016.01) |
| *H01M 8/04007* | (2016.01) |
| *H01M 8/124* | (2016.01) |

(52) U.S. Cl.
CPC ..... *H01M 8/0618* (2013.01); *H01M 8/04067* (2013.01); *H01M 8/04126* (2013.01); *H01M 8/04708* (2013.01); *H01M 8/04835* (2013.01); *H01M 2008/1293* (2013.01)

(58) Field of Classification Search
CPC ........... H01M 8/0618; H01M 8/04126; H01M 8/04835; H01M 8/04708; H01M 8/04097; H01M 8/04067; H01M 2008/1293; Y02E 60/50

USPC ........................................................ 429/509
See application file for complete search history.

(56) References Cited

U.S. PATENT DOCUMENTS

| | | | |
|---|---|---|---|
| 9,190,673 B2 | 11/2015 | Venkataraman et al. | |
| 9,287,572 B2 | 3/2016 | Weingaertner et al. | |
| 9,799,902 B2 | 10/2017 | Weingaertner et al. | |
| 2008/0118796 A1* | 5/2008 | Brantley | B01J 19/2495 48/61 |
| 2015/0111121 A1 | 4/2015 | Weingaertner et al. | |
| 2016/0240876 A1 | 8/2016 | Weingaertner et al. | |

OTHER PUBLICATIONS

Zyryanova, M.M. et al., "Low Temperature Catalytic Steam Reforming of Propane-Methane Mixture Into Methane-Rich Gas: Experiment and Macrokinetic Modeling," Fuel, vol. 135, pp. 76-82, (2014).
http://www.propane101.com/propanegradesandquality.htm, view date Nov. 28, 2018, 2 pages.

* cited by examiner

*Primary Examiner* — Gary D Harris
(74) *Attorney, Agent, or Firm* — The Marbury Law Group, PLLC

(57) ABSTRACT

A fuel cell system and method of operating, the system including a fuel cell stack configured to generate electricity and anode exhaust, a mixer configured to mix fuel received from a fuel source with steam and the anode exhaust, a low-temperature pre-reformer configured to at least partially reform fuel received from the mixer at a temperature of less than about 420° C., and an anode recuperator configured to heat fuel received from the low-temperature pre-reformer using the anode exhaust and to provide the fuel to the fuel cell stack.

20 Claims, 7 Drawing Sheets

SOLID OXIDE FUEL CELL SYSTEM CONFIGURED FOR HIGHER HYDROCARBON FUELS

FIELD

Aspects of the present invention relate to solid oxide fuel cell systems configured to operate using fuels that include higher hydrocarbons (e.g., $C_nH_{2n+2}$, $n \geq 2$).

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system comprises a fuel cell stack configured to generate electricity and anode exhaust; a mixer configured to mix fuel received from a fuel source with steam and the anode exhaust; a low-temperature pre-reformer configured to at least partially reform fuel received from the mixer at a temperature of less than about 420° C.; and an anode recuperator configured to heat fuel received from the low-temperature pre-reformer using the anode exhaust and to provide the fuel to the fuel cell stack.

According to various embodiments, a method of operating a fuel cell system comprises generating electricity and anode exhaust in a fuel cell stack; mixing a higher hydrocarbon fuel with steam and the anode exhaust to form a mixed fuel; at least partially reforming the mixed fuel at a temperature of less than about 420° C. to form a reformed fuel; heating the reformed fuel using the anode exhaust; and providing the heated reformed fuel to the fuel cell stack, wherein the higher hydrocarbon fuel comprises at least two carbon atoms per molecule.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
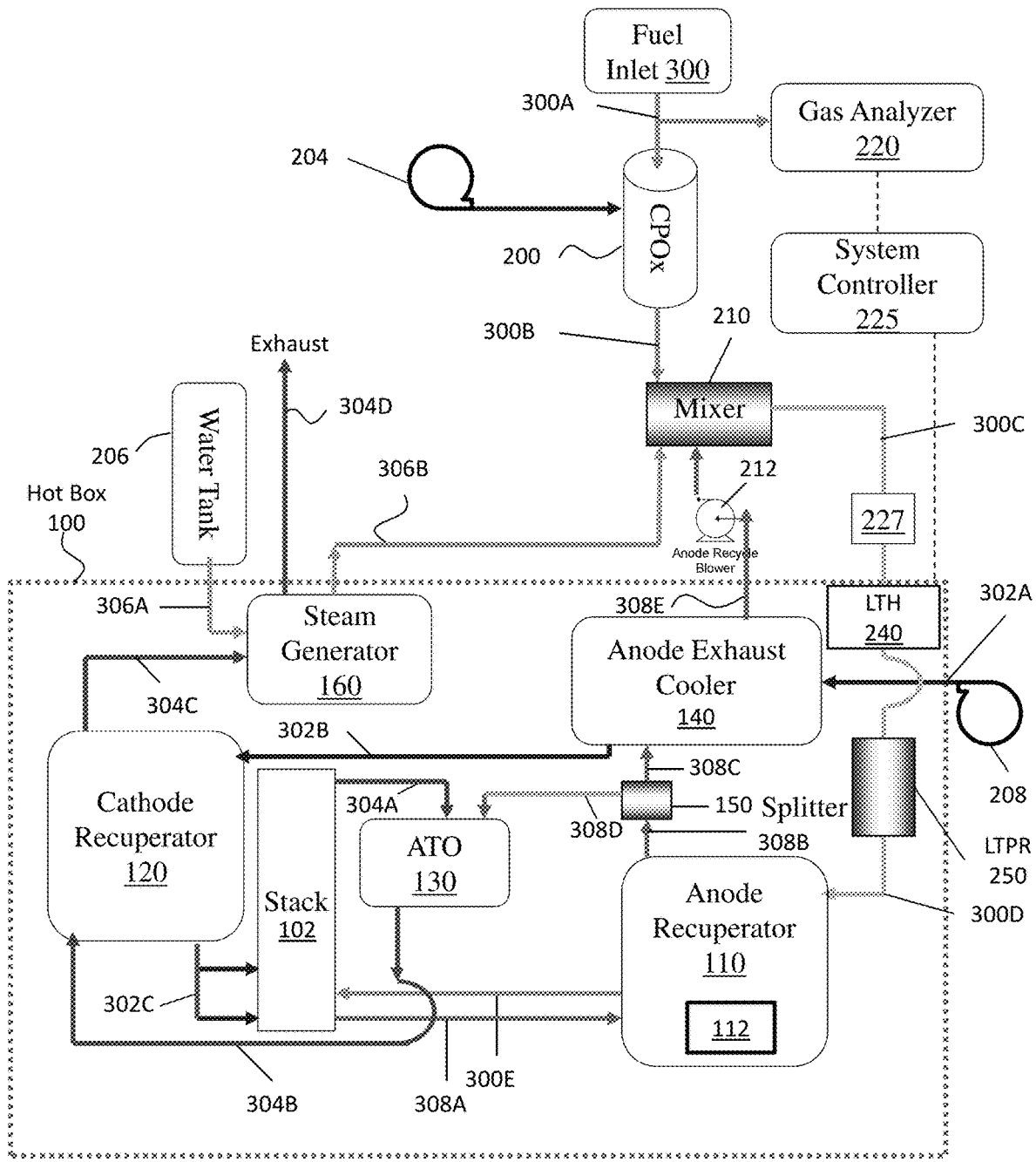
FIG. 1A is a schematic of a SOFC fuel cell system, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Herein, ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Solid oxide fuel cell (SOFC) systems are generally configured to operate most efficiently using natural gas (e.g., methane). In areas where a connection to a natural gas line cannot be made, propane or butane may be used as a substitute for natural gas. Commercial propane is a mixture of over 95% mass propane, the balance consisting of $C_2$-$C_4$ paraffins and olefins, and small amounts (ppm levels) of sulfur-containing odorants. Propane includes HD-5 propane containing a minimum of 90% mass propane, a maximum of 5% mass propylene and remainder other gases such as iso-butane, butane, methane, etc., and HD-10 propane (as provided in http://www.propane101.com/propanegradesandquality.htm). This mixture tends to form coke on SOFC anodes and/or reformer catalysts when exposed to conventional reforming temperatures. In addition, because sulfur tends to be a poison to pre-reforming and reforming catalysts, an upstream desulfurization unit may be needed to reduce the sulfur in the feed to trace amounts (<1 ppm).

In addition, many gas utilities mitigate peak winter demands by using propane peak shaving and standby systems. Most of these systems produce "propane-air" for direct replacement of natural gas during peak demand periods. Typical delivered compositions can be as high as around 30% propane, 25% air, and 45% methane. However, some regions may be as low as 1%/1% propane/air (e.g., liquid propane air (LPA) and natural gas mixture). In conventional SOFC systems, the inclusion of air and or higher hydrocarbons appears to facilitate coking and/or deactivation of reformation catalysts, which may lead to coking and deactivation of fuel cell anodes.

Exemplary fuels including higher hydrocarbons may be comprised of a combination of various molecules including CO, $CO_2$, $H_2O$, $H_2$, $O_2$, $N_2$, Ar, $CH_4$, $C_2H_6$, $C_2H_4$, $C_3H_8$, $C_3H_6$, n-$C_4H_{10}$ (n-butane), i-$C_4H_{10}$ (isobutane), $C_5H_{12}$, and $C_6H_{14}$ and the various molecules may represent different molecular fractions (or percentages) of the overall fuel. As examples, $CH_4$ may comprise from less than 96% of the molecules in the fuel in the fuel inlet stream, e.g., 40.496% to 95.994% of the molecules, $C_2H_6$ may comprise from 1.250% and 8.00% of the molecules in the fuel in the fuel inlet stream, $C_2H_4$ may comprise from 0.040% to 0.8% of the molecules in the fuel in the fuel inlet stream, $C_3H_8$ may comprise from 0.360% to 30.760% of the molecules in the fuel in the fuel inlet stream, $C_3H_6$ may comprise from 0.001% to 1.620% of the molecules in the fuel in the fuel inlet stream, n-$C_4H_{10}$ may comprise from 0.001% to 0.400% of the molecules in the fuel in the fuel inlet stream, i-$C_4H_{10}$ may comprise from 0.001% to 0.200% of the molecules in the fuel in the fuel inlet stream, $C_5H_{12}$ may comprise from 0.001% to 0.090% of the molecules in the fuel in the fuel inlet stream, and $C_6H_{14}$ may comprise from 0.001% to 0.030% of the molecules in the fuel in the fuel inlet stream.

Operating conventional SOFC systems using higher hydrocarbons may result in the surface deposition of carbon (i.e., coking) with respect to various elements thereof. For example, the coking may result in deactivation of catalyst surfaces and may provide nucleation sites for the creation of more coke. Once the coking process begins, the lifetime of a catalytic reactor may be severely compromised. Therefore, the prevention of coke formation is of high importance in reforming process engineering, in order to allow fuel cell systems to operate using fuels such as propane.

According to various embodiments of the present disclosure, provided are SOFC systems configured to operate using fuels including higher hydrocarbons (e.g., two or more carbon atoms per molecule), such as propane, without suffering from coking and/or catalyst deactivation. For example, the present disclosure provides SOFC systems that are configured to prevent or substantially prevent coking and/or cycle life reduction, when operating using a fuel that comprises at least 50 wt % of a higher hydrocarbon (e.g., 50 wt % to 100 wt % higher hydrocarbons), such as at least 75 wt %, at least 80 wt %, at least 90 wt %, or about 100 wt % propane or butane. In some embodiments, a SOFC system may have an operational lifetime of at least 5000 hours when operating using a fuel that comprises at least 50 wt % propane, butane, and/or other higher hydrocarbon.

In particular, various embodiments provide SOFC systems that are configured to reform hydrocarbons, and in particular, higher hydrocarbons, using low-temperature steam reformation. Herein, a "low-temperature steam reformation" may refer to various reactions which hydrocarbon fuels and water are converted into methane, $H_2$, CO, and/or $CO_2$, at temperatures of less than about 430° C., such as temperatures ranging from about 240° C. to about 420° C., ranging from about 245° C. to about 415° C., or ranging from about 250° C. to about 411° C.

Without wishing to be bound to a particular theory, it is believed that the steam reformation process may be represented by a net reaction, as shown in Equation 1 below. With regard to propane in particular, the process may be represented by one or both of net reactions shown in Equations 2 and 3 below.

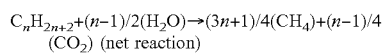
$C_nH_{2n+2}+(n-1)/2(H_2O)\rightarrow(3n+1)/4(CH_4)+(n-1)/4(CO_2)$ (net reaction)      1

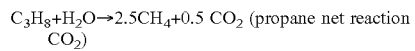
$C_3H_8+H_2O\rightarrow 2.5CH_4+0.5 CO_2$ (propane net reaction $CO_2$)      2

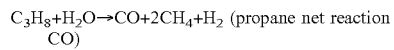
$C_3H_8+H_2O\rightarrow CO+2CH_4+H_2$ (propane net reaction CO)      3

The reformation process may involve various intermediate reactions, such as steam reformation, methanation, and/or water gas shift reactions, which are respectively shown below as Equations 4-8 below:

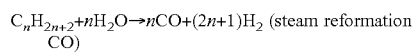
$C_nH_{2n+2}+nH_2O\rightarrow nCO+(2n+1)H_2$ (steam reformation CO)      4

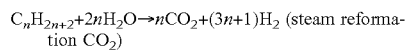
$C_nH_{2n+2}+2nH_2O\rightarrow nCO_2+(3n+1)H_2$ (steam reformation $CO_2$)      5

$CO+3H_2\leftrightarrow CH_4+H_2O$ (CO methanation)      6

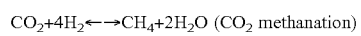
$CO_2+4H_2\leftrightarrow CH_4+2H_2O$ ($CO_2$ methanation)      7

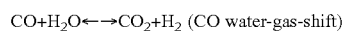
$CO+H_2O\leftrightarrow CO_2+H_2$ (CO water-gas-shift)      8

It is believed that at temperatures of less than about 350° C., the methanation reactions of Equations 6 and 7 favor the formation of methane.

Figure 1B:
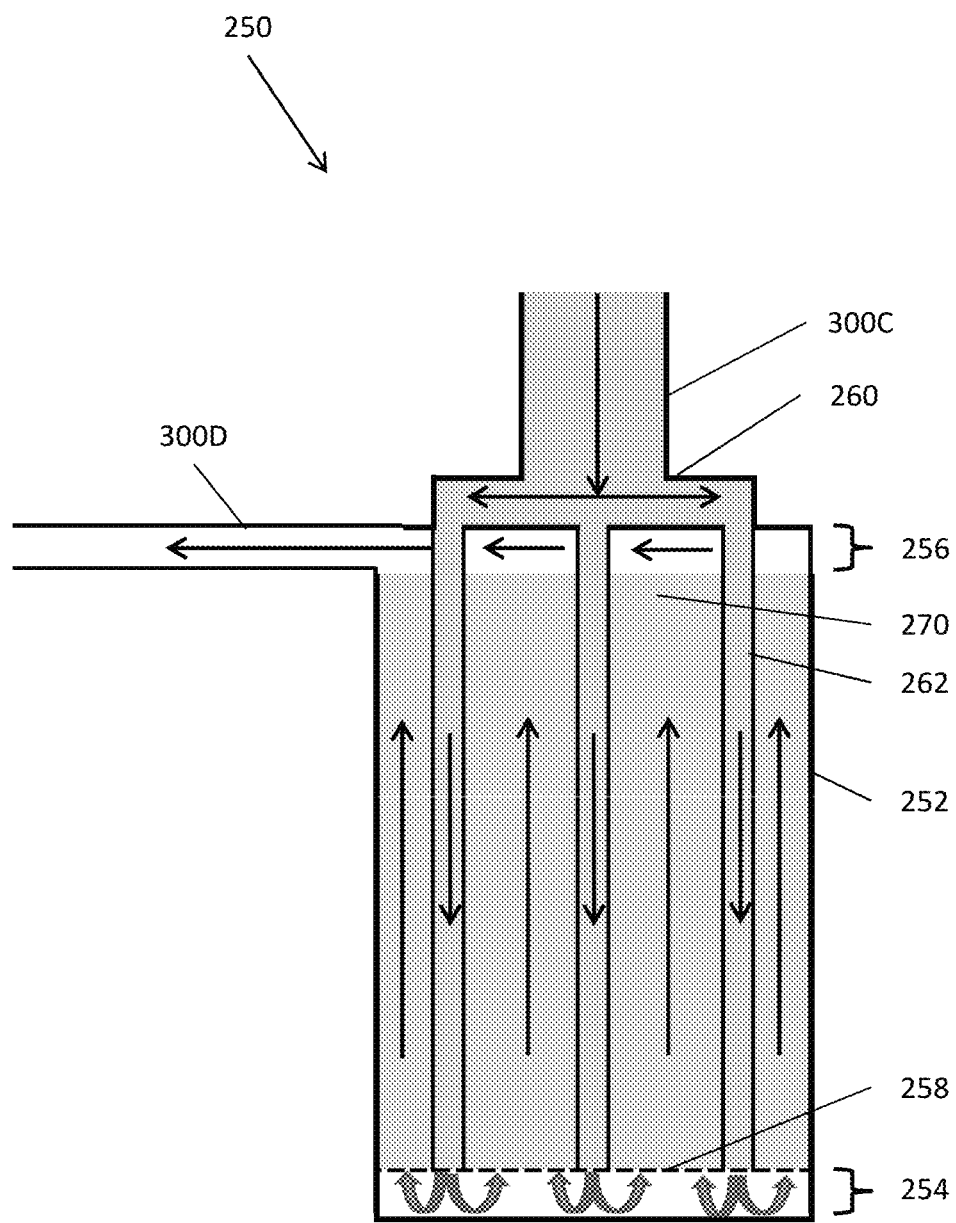
FIG. 1B is a schematic of a low-temperature reformation reactor of the system of FIG. 1A.

FIG. 1A is a schematic representation of a SOFC system 10, according to various embodiments of the present disclosure, and FIG. 1B is a schematic of a pre-reformer 250 of FIG. 1A. Referring to FIGS. 1A and 1B, the system 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 120, an anode tail gas oxidizer (ATO) 130, an anode exhaust cooler (AEC) 140, a splitter 150, a steam generator 160, and a low-temperature reformation reactor, such as a low-temperature pre-reformer 250. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. Optionally, water from the water source 206 (e.g., water tank or pipe) may also be provided into the CPOx reactor 200 for use with higher hydrocarbon fuels, such as propane. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a utility gas line and/or a gas tank, such as a higher hydrocarbon gas tank (e.g., a propane tank), including a valve to control an amount of fuel provided to the CPOx reactor 200. The CPOx blower 204 may provide air to the CPOx reactor 202. The fuel and/or air may be provided to the mixer 210 by fuel conduit 300B. Fuel flows from the mixer 210 to the low-temperature pre-reformer 250 through fuel conduit 300C. Fuel flows from the low-temperature pre-reformer 250 to the anode recuperator 110 through fuel conduit 300D, and flows from the anode recuperator 110 to the stack 102 through fuel conduit 300E.

The fuel is then reacted in the stack 102, and the resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air flows from the cathode recuperator 120 to the stack 102 through air conduit 302C.

Anode exhaust generated in the stack 102 is provided to the anode recuperator 110 through recycling conduit 308A. The anode exhaust may contain unreacted fuel. The anode exhaust may also be referred to herein as fuel exhaust. The anode exhaust may be provided from the anode recuperator 110 to a splitter 150 by recycling conduit 308B. A first portion of the anode exhaust may be provided from the splitter 150 to the anode exhaust cooler 140 by recycling conduit 308C. A second portion of the anode exhaust may be provided from the splitter 150 to the ATO 130 by recycling conduit 308D. Anode exhaust may be provided from the anode exhaust cooler 140 to mixer 210 by recycling conduit 308E. The anode recycle blower 212 may be configured to move anode exhaust though recycling conduit 308E, as discussed below.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B. Exhaust flows from the cathode recuperator 120 to the steam generator 160 through exhaust conduit 304C. Exhaust flows from the steam generator 160 and out of the hotbox 100 through exhaust conduit 304D.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel.

The fuel mixture may then be supplied to the pre-reformer 250 via fuel conduit 300C. The pre-reformer 250 may be configured to reform higher hydrocarbons through low-temperature steam reformation as described above.

In various embodiments, the pre-reformer 250 may include a housing 252, a manifold 260, and heating conduits 262, as shown in FIG. 1B. A reforming catalyst 270 may be disposed in the housing 252. For example, the catalyst 270 may be disposed in the housing 252 such that a first collection area 254 and a second collection area 256 are formed inside of the housing 252, on opposing ends of the catalyst 270. The catalyst 270 may be in the form a particulate bed or a monolith including through-holes. In some embodiments, the housing 252 may optionally include a porous barrier 258 to prevent the catalyst 270 from entering the first collection area 254. The catalyst 270 may be a nickel-based catalyst, such as a Ni/Al$_2$O$_3$ catalyst, a Pt—Ni/Al$_2$O$_3$ catalyst, a Ni—Cr catalyst, or the like.

The manifold 260 may be disposed on one end of the housing 252 and may be fluidly connected to fuel conduit 300C. The manifold 260 may be configured to provide the fuel mixture to the heating conduits 262. The heating conduits 262 may extend from the manifold 260 to the first collection area 254, and may pass through the second collection area 256 and the catalyst 270. For example, heating conduits 262 may extend through through-holes formed in the catalyst 270, or the catalyst may be packed around the heating conduits 262. Accordingly, the heating conduits 262 may be in thermal contact with the catalyst 270. The second collection area 256 may be fluidly connected to fuel conduit 300D. The heating conduits 262 may be fuel tubes which provide heat exchange between the fuel flowing through the conduits 262 and the catalyst 270.

In some embodiments, the fuel mixture in fuel conduit 300C may have a temperature that is less than a temperature at which the catalyst 270 provides a desired reaction rate. For example, the temperature of the fuel mixture may be less than a reaction initiation or a reaction sustaining temperature of the catalyst 270. For example, the fuel mixture may have a temperature ranging from about 160° C. to about 200° C., such as from about 170° C. to about 190° C., or about 180° C.

In operation, the manifold 260 provides the fuel mixture to the heating conduits 262, which provide the fuel mixture to the first collection area 254. The fuel mixture flows from the first collection area 254 and into the catalyst 270 where the fuel mixture is reformed. After being reformed in the catalyst 270, the reformed fuel enters the second collection area 256 and is provided to fuel conduit 300D.

Heat generated by the reformation of fuel in the catalyst 270 may be used to heat the fuel in the heating conduits 262. Accordingly, the fuel may be heated to a minimum reaction temperature sufficient to initiate low-temperature steam reformation, prior to entering the catalyst 270. For example, the minimum reaction temperature may range from about 240° C. to about 260° C., such as about 250° C.

The heating of the fuel in the heating conduits 262 may also operate to cool the fuel in the catalyst, such that the fuel in the catalyst 270 remains below a set maximum reaction temperature. For example, the maximum reaction temperature may be at or below the equilibrium temperature of the methanation reaction, such that higher hydrocarbons are reformed without reforming methane in the fuel. The maximum temperature may also be below a peak coking (e.g., 440° C.) temperature, such that the formation of coke during the reformation of the fuel is reduced and/or prevented. For example, the maximum reaction temperature may be about 415° C. or less, such as 410° C. or less. Accordingly, the pre-reformer 250 may have a counter-current fuel flow configuration.

In some embodiments, such as during cold start-up operations, the CPOx reactor 200 may be operated until the fuel mixture in fuel conduit 300C reaches the minimum reaction temperature or until the catalyst 270 temperature is hot enough to sustain a reaction. In other embodiments, the system 10 may optionally include a low-temperature heater 240 as shown in FIG. 1A. The low-temperature heater 240 may be configured to heat the fuel mixture in fuel conduit 300C to the minimum reaction temperature. For example, the low-temperature heater 240 may be a resistive heater or a combustion heater.

The fuel may then be provided to the anode recuperator 110 via fuel conduit 300D. The fuel may be heated in the anode recuperator 110 by the anode exhaust provided by recycling conduit 308A.

Figure 2:
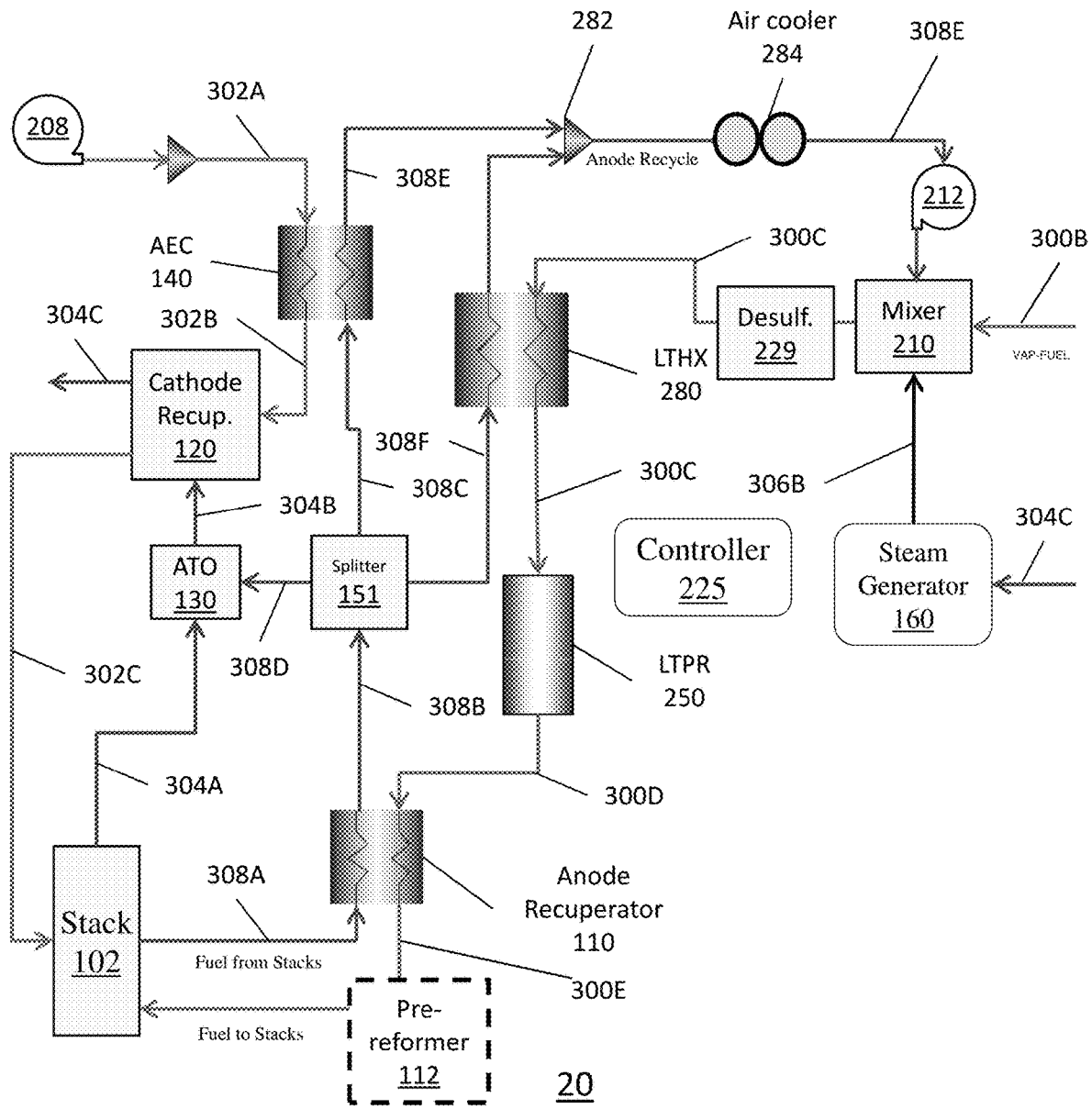
FIG. 2 is a schematic of a SOFC fuel cell system, according to various embodiments of the present disclosure.

In some embodiments, the system 10 may optionally include a high-temperature pre-reformer 112 (shown in dashed lines in FIG. 2). For example, if the fuel from the low-temperature pre-reformer 250 contains a residual amount of higher hydrocarbons and/or methane that would result in coking, the fuel may be further reformed in the pre-reformer 112. The pre-reformer 112 may include one or more catalysts configured to operate at temperatures of above about 400° C. For example, the catalysts may be disposed between walls of the anode recuperator 110, or may be disposed in an opening formed within the anode recuperator 110. In other embodiments, one or more of the catalysts may be in the form of pucks or disks. In other embodiments, one or more of the pre-reformer 112 may be disposed downstream of the anode recuperator 110, with respect to a fuel-flow direction.

In various embodiments, the catalysts may include a metallic/ceramic foam with a catalytic layer (e.g., palladium, nickel and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof. The reforming catalyst may include one or more nickel/rhodium catalysts configured to reform higher hydrocarbons (C2-C5) at very broad O:C ratios. For example, the reforming catalyst may be configured to reform a fuel stream having at least 10 vol % of C2 and C3 hydrocarbons, without significant coke formation. For example, the reforming catalyst 116 may be configured to reform a fuel stream having up to 20 vol %, up to 18 vol %, up to 16 vol %, up to 14 vol %, or up to 12 vol % of C2 and C3 hydrocarbons.

In some embodiments, the pre-reformer 112 may include a hydrogenation catalyst. The hydrogenation catalyst may be configured to combine unsaturated hydrocarbons, such as ethylene and/or propylene (alkenes), with available hydrogen in the fuel stream, resulting in saturated hydrocarbons, such as ethane and propane or other alkanes. The hydrogenation catalyst may be disposed upstream of the reforming catalyst or integrated throughout the reforming catalyst.

The hydrogenation catalyst may include a ceramic base, such as alumina, ceria, zirconia, or a mixture of ceria and zirconia, with a small percentage of a catalyst metal such as palladium. For example, the hydrogenation catalyst may include an amount of palladium ranging from about 0.1 wt % to about 5 wt %, such as from about 0.2 wt % to about 4 wt %, from about 0.3 wt % to about 3 wt %, or about 0.5 wt % to about 2 wt %. The hydrogenation catalyst may also include some inhibitors and/or stabilizers such as vanadium, tungsten, and/or other similar transition metal materials.

Fuel is provided from the anode recuperator 110 to the stack 102 by fuel conduit 300E, where the fuel is reacted to generate electricity. The resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system 10 may further include a system controller 225 configured to control various elements of the system 10, and may optionally include a gas analyzer 220 configured to analyze the fuel in fuel conduit 300A. The controller 225 may include a central processing unit configured to execute stored instructions. For example, the controller 225 may configured to control fuel and/or air flow through the system 10, according to fuel composition data received from the gas analyzer 220

The controller 225 may be configured to control the operation of the CPOx reactor 200 and/or the low-temperature heater 240, according to a fuel temperature detected by a temperature sensor 227.

In some embodiments, the controller 225 may be configured to control an O:C ratio in the mixed fuel, such that coking is prevented. For example, the controller 225 may be configured to control a O:C ratio in the system 10, by controlling amounts (e.g., flow rates) of steam, fuel, and anode exhaust provided to the mixer 210. In some embodiments, the controller 225 may be configured such that the fuel mixture in the mixer 210 has an O:C ratio ranging from about 1.5 to about 2.5, such as from about 1.8 to about 2.3, or from about 2 to about 2.2.

In some embodiments, the controller 225 may control the O:C ratio according to a gas composition detected by the gas analyzer 220. For example, the controller 225 may be configured to reduce the O:C ratio according to an amount of propane detected in the fuel, by reducing an amount of supplied steam. For example, a method of O:C ratio control described in U.S. Pat. No. 8,211,583, incorporated herein by reference, may be used.

In various embodiments, the controller 225 may also be configured to control relative amounts of anode exhaust provided from the stack 102 to the ATO 130 and the anode recuperator 110. For example, the controller 225 may be configured to increase an amount of anode exhaust provided to the anode recuperator 110, according to an amount of propane and/or other higher hydrocarbons detected in the fuel.

FIG. 2 is a schematic of a SOFC system 20, according to various embodiments of the present disclosure. The system 20 is similar to the system 10 of FIG. 1A, so only the differences therebetween will be discussed in detail.

Referring to FIG. 2, the system 20 includes a splitter 151, a low-temperature heat exchanger (LTHX) 280, a recycle valve 282, and an optional air cooler 284. The splitter 151 receives anode exhaust from the anode recuperator 110 through recycling conduit 308B. The splitter 151 provides anode exhaust to the anode exhaust cooler 140 through recycling conduit 308C, to the anode tail gas oxidizer 130 through recycling conduit 308D, and to the low-temperature heat exchanger 280 through recycling conduit 308F.

The low-temperature heat exchanger 280 may be configured to heat fuel in fuel conduit 300C using anode exhaust in recycling conduit 308F. The recycle valve 282 may be a 3-way valve configured to control the flow rates of anode exhaust to the anode exhaust cooler 140 and the low-temperature heat exchanger 280, to control an amount of heat transferred to the fuel in fuel conduit 300C. For example, if the temperature of fuel in fuel conduit 300C is below a set temperature the recycle valve 282 may be configured to increase the anode exhaust flow rate through recycling conduit 308F and decrease the anode exhaust flow rate through recycling conduit 308C.

The air cooler 284 may be configured to cool the anode exhaust in recycling conduit 308E. For example, the air cooler 284 may use ambient air to cool the anode exhaust. The anode exhaust may be cooled to a temperature sufficient to prevent overheating of the anode recycle blower 212.

In some embodiments, the system 20 may optionally include a desulfurizer 229 configured to remove sulfur from the fuel in fuel conduit 300C.

In some embodiments, the system 20 may optionally include a high-temperature pre-reformer 112 configured to partially reform fuel received from the anode recuperator 110. In some embodiments, the pre-reformer 112 may be disposed downstream of the anode recuperator 110, as shown in FIG. 2. However, in other embodiments, the pre-reformer 112 may be disposed the inside the anode recuperator 110, or the pre-reformer 112 may be located radially inward from the anode recuperator 110 (e.g., similar to the configuration shown in FIG. 5 which is described below), or the pre-reformer 112 may be omitted.

Figure 3A:
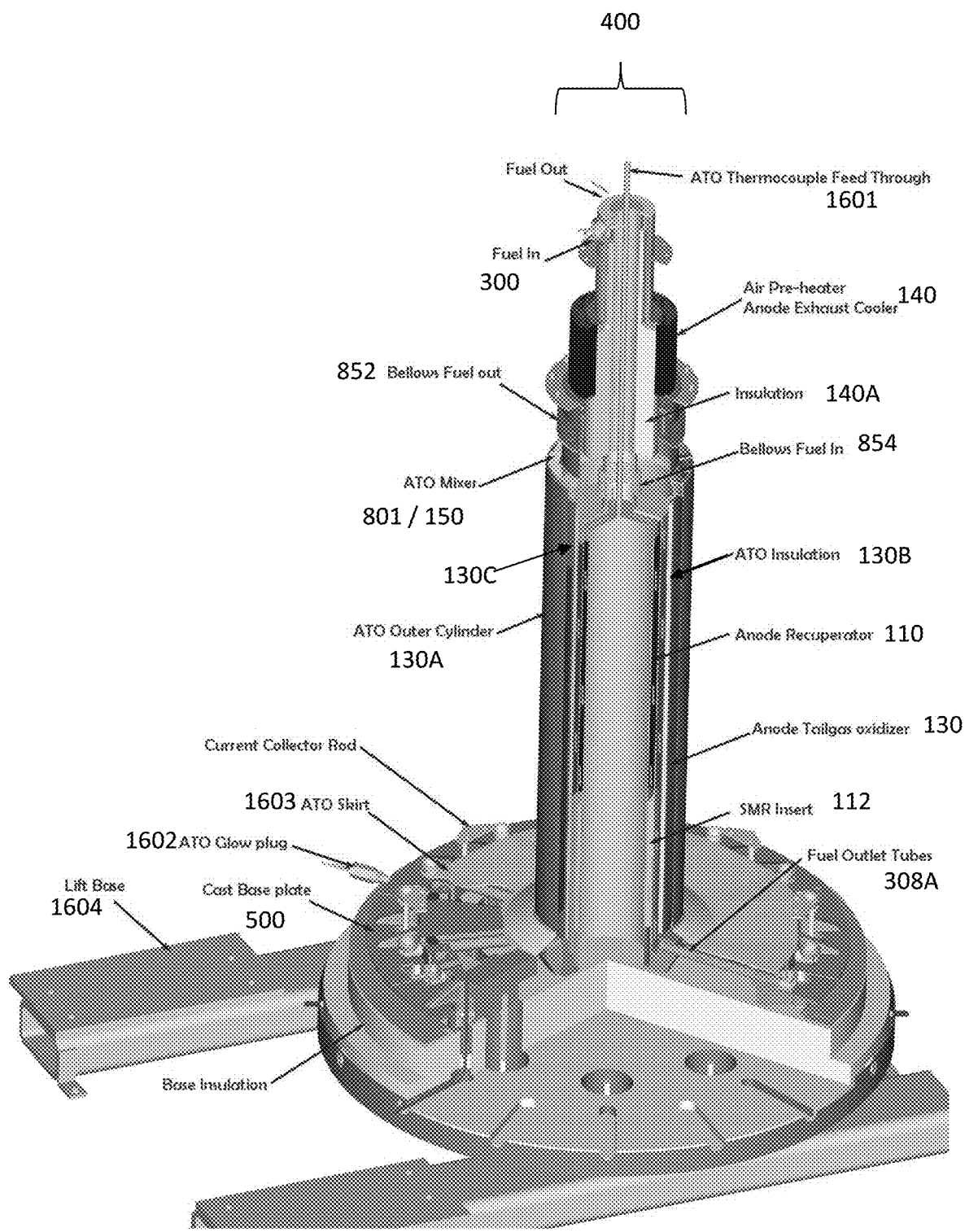
FIG. 3A is a sectional perspective view of a central column of the fuel cell system of FIG. 1.
Figure 3B:
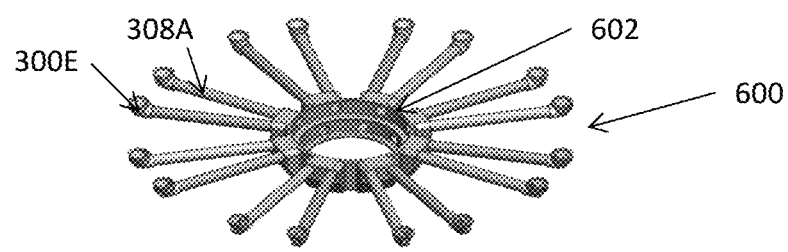
FIG. 3B illustrates an anode hub structure connected to the column of FIG. 3A.

FIG. 3A illustrates a central column 400 of the system 10, according to various embodiments of the present disclosure. FIG. 3B illustrates an anode hub structure 600 disposed in a hot box base 500 on which the column 400 may be disposed. Referring to FIGS. 3A and 3B, fuel cell stacks (not shown) may be disposed around the column 400, on the hot box base 500. The column 400 includes the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An oxidation catalyst may be located in the space between the outer cylinder 130A and the ATO insulation 130B. An ATO thermocouple feed through 1601 extends through the anode exhaust cooler 140, to the top of the ATO 130. The temperature of the ATO 130 may thereby be monitored by inserting a thermocouple (not shown) through this feed through 1601.

The anode hub structure 600 is positioned under the anode recuperator 110 and ATO 130 and over the hot box base 500. The anode hub structure 600 is covered by an ATO skirt 1603. A combined ATO mixer 801 and fuel exhaust splitter 150 is located over the anode recuperator 110 and ATO 130 and below the anode cooler 140. An ATO glow plug 1602, which aids the oxidation of the stack fuel exhaust in the ATO, may be located near the bottom of the ATO 130.

The anode hub structure 600 is used to distribute fuel evenly from a central plenum to fuel cell stacks disposed around the central column 400. The anode hub structure 600 includes a grooved cast base 602 and a "spider" hub of fuel inlet conduits 300E and outlet conduits 308A. Each pair of conduits 300E, 308A connects to a fuel cell stack. Anode side cylinders (e.g., anode recuperator 110 inner and outer cylinders and ATO outer cylinder 130A) are then welded or brazed into the grooves in the base 602, creating a uniform volume cross section for flow distribution as discussed below.

Also illustrated in FIG. 3A, is a lift base 1604 located under the hot box base 500. In an embodiment, the lift base 1604 includes two hollow arms with which the forks of a fork truck can be inserted to lift and move the fuel cell unit, such as to remove the fuel cell unit from a cabinet (not shown) for repair or servicing.

Figure 4C:
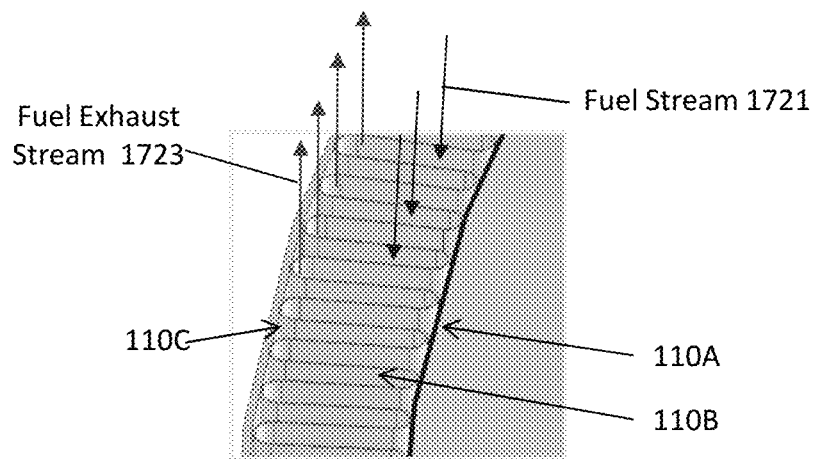
FIGS. 4A-4C are perspective and sectional views of components of the central column of FIG. 3A, according to various embodiments of the present disclosure.
Figure 4A:
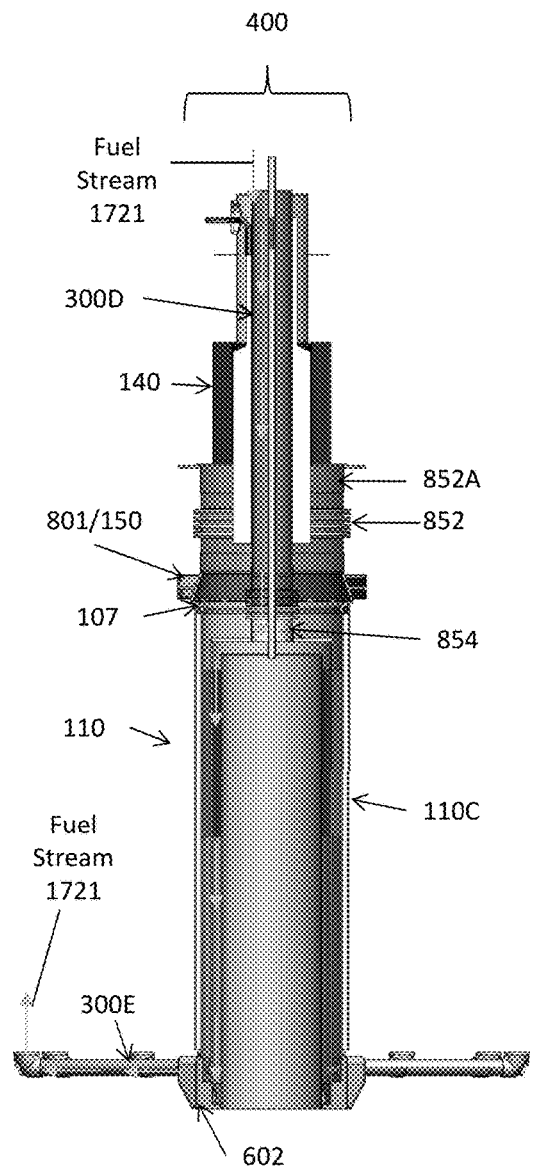
Figure 4B:
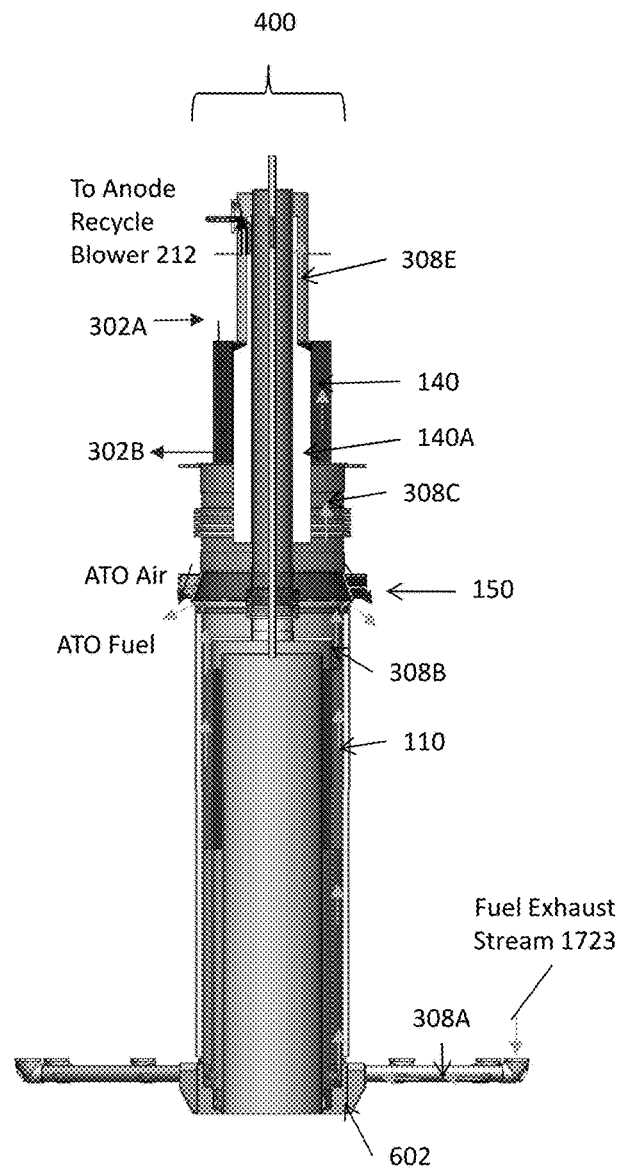

FIGS. 4A and 4B are side cross-sectional views showing flow distribution through the central column 400, and 4C is top cross-sectional view taken through the anode recuperator 110. Referring to FIGS. 1A, 4A and 4C, the anode recuperator 110 includes an inner cylinder 110A, a corrugated plate 110B, and an outer cylinder 110C that may be coated with the ATO insulation 130B. A fuel stream 1721 from fuel conduit 300D enters the top of the central column 400. The fuel stream 1721 then bypasses the anode cooler 140 by flowing through its hollow core and fuel bellows 854, and then flows through the anode recuperator 110, between the outer cylinder 110C and the and the corrugated plate 110B.

The fuel stream 1721 then flows through the base 602 and conduits 300E of the anode hub structure 600 (FIG. 3B), to the stacks.

Referring to FIGS. 1A, 4B and 4C, a fuel exhaust stream 1723 flows from the stacks through conduits 308A into the base 602, and from the base 602 through the anode recuperator 110, between in inner cylinder 110A and the corrugated plate 110B, and into the splitter 150. A portion of the fuel exhaust stream 1723 flows from the splitter 150 to the anode cooler 140 through recycling conduit 308C, while another portion flows from the splitter 150 to the ATO 130 through recycling conduit 308D (see FIG. 1A). Optionally a third portion of the fuel exhaust stream 1723 flows from the splitter 151 to the LTHX 280, as shown in FIG. 2. Anode cooler inner core insulation 140A may be located between the fuel conduit 300D and bellows 852/supporting cylinder 852A located between the anode exhaust cooler 140 and the ATO mixer 801, as shown in FIGS. 3A, 4B, and 4C. This insulation minimizes heat transfer and loss on the way to the anode exhaust cooler 140. Insulation 140A may also be located between fuel conduit 300D and the anode exhaust cooler 140 to avoid heat transfer between the fuel inlet stream in fuel conduit 300D and the streams in the anode cooler 140. A bellows 852 and a supporting cylinder 852A may be disposed between the anode cooler 140 and the splitter 150.

FIG. 4B also shows air flowing from the air conduit 302A to the anode cooler 140 (where it exchanges heat with the fuel exhaust stream), into air conduit 302B to the cathode recuperator 120.

As will be described in more detail below and as shown in FIGS. 1A and 4B, the fuel exhaust stream 1723 exits the anode recuperator 110 and is provided into splitter 150 through recycling conduit 308B. The splitter 150 splits the anode exhaust stream into first and second anode exhaust streams. The first stream is provided to the ATO 130 through recycling conduit 308D. The second stream is provided into the anode cooler 140 through recycling conduit 308C.

The relative amounts of anode exhaust provided to the ATO 130 and the anode exhaust cooler 140 is controlled by the anode recycle blower 212. The higher the anode recycle blower 212 speed, the larger portion of the fuel exhaust stream is provided into recycling conduit 308C and a smaller portion of the fuel exhaust stream is provided to the ATO 130, and vice-versa. Preferably, the splitter 150 comprises an integral cast structure with the ATO mixer 801.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 150 may have a temperature of above 350° C., such as from about 350 to about 500° C., for example, from about 375 to about 425° C., or from about 390 to about 410° C. Furthermore, since a smaller amount of anode exhaust is provided into the anode cooler 140 (e.g., not 100% of the anode exhaust is provided into the anode cooler due to the splitting of the anode exhaust in splitter 150), the heat exchange area of the anode cooler 140 may be reduced.

The anode exhaust stream provided to the ATO 130 may be combusted and provided to the cathode recuperator 120 through exhaust conduit 304B.

Figure 5:
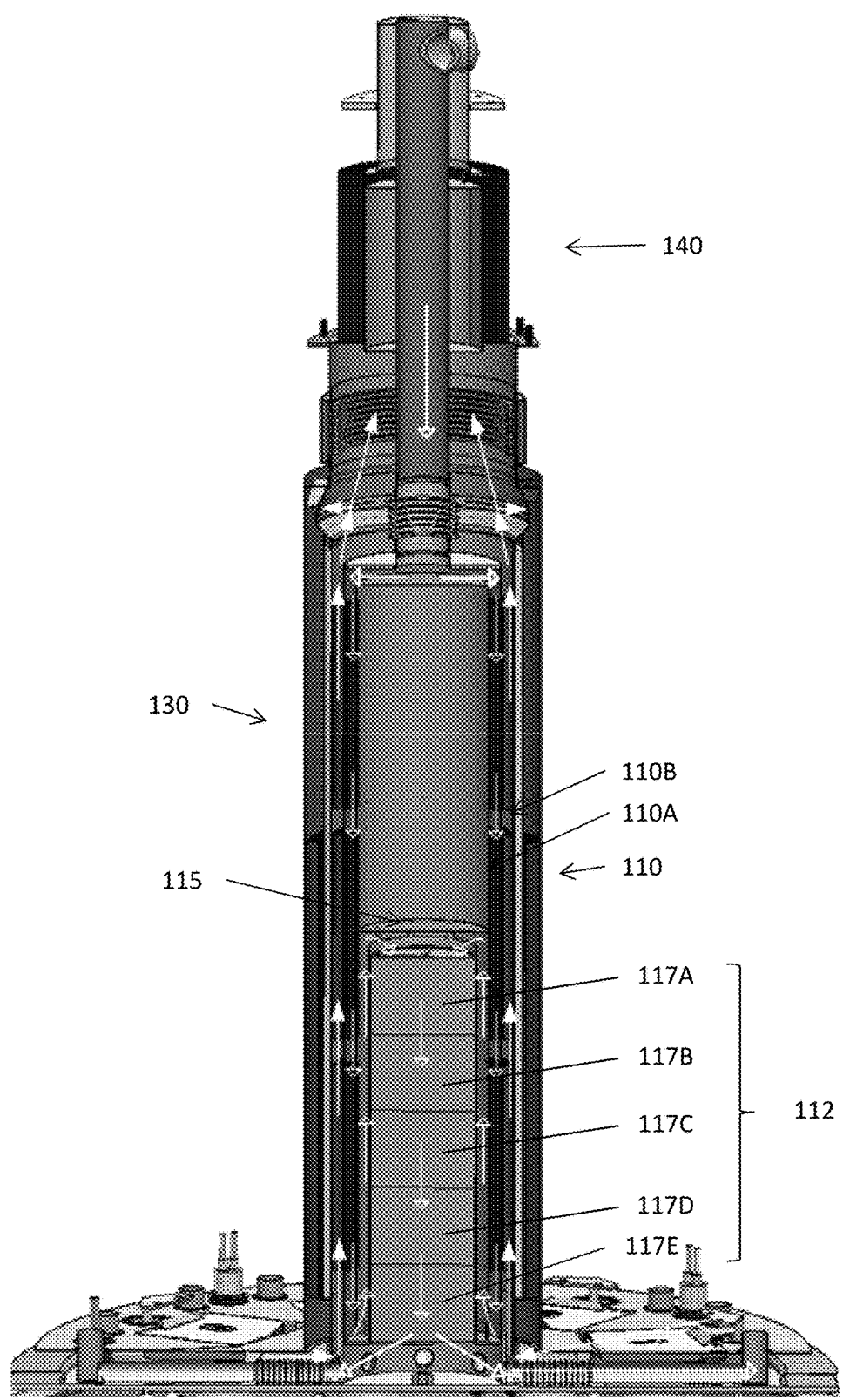
FIG. 5 is a sectional view of a central column of a fuel cell system, according to various embodiments of the present disclosure.

FIG. 5 illustrates a modified central column 401 of the system 10 according to various embodiments of the present disclosure, which is similar to that described in U.S. Pat. No. 9,287,572, which is incorporated herein by reference in its entirety. The central column 401 is similar to the central column 400 of FIG. 3, so only the difference therebetween will be described in detail.

Referring to FIG. 5, the column 401 includes a catalyst housing 115 disposed inside a central cavity of the anode recuperator 110. The catalyst housing 115 includes one or more reformer catalyst pucks 117A-117E some or all of which constitute the above described pre-reformer 112 in one embodiment. Each puck 117 may include the same reformer catalyst, or one or more of the pucks 117 may include different reformer catalysts. In another embodiment, the anode recuperator 110 may include two sections with a low temperature pre-reformer located between the two anode recuperator sections and a high temperature pre-reformer located downstream of both anode recuperator sections.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system comprising:
    a fuel cell stack configured to generate electricity and anode exhaust;
    a mixer configured to mix fuel received from a fuel source with steam provided from a steam generator and the anode exhaust provided from the fuel cell stack via a recycling conduit which fluidly connects the mixer and the fuel cell stack;
    a low-temperature pre-reformer comprising a nickel alloy reformation catalyst configured to at least partially reform a molecular hydrocarbon containing fuel received from the mixer at a temperature of less than about 420° C.;
    a fuel conduit fluidly connecting the mixer to the low-temperature pre-reformer, the fuel conduit configured to provide the molecular hydrocarbon containing fuel from the mixer to the low-temperature pre-reformer; and
    an anode recuperator configured to heat fuel received from the low-temperature pre-reformer using the anode exhaust and to provide the fuel to the fuel cell stack.

2. The fuel cell system of claim 1, wherein the fuel source comprises a hydrocarbon fuel tank configured to hold the molecular hydrocarbon containing fuel, the molecular hydrocarbon containing fuel having two or more carbon atoms per molecule.

3. The system of claim 2, wherein:
    the pre-reformer comprises a counter current flow configuration configured to maintain the reformation catalyst at a temperature of less than about 415° C.; and
    the molecular hydrocarbon containing fuel comprises propane or butane.

4. The system of claim 1 wherein the pre-reformer comprises:
    a housing comprising an inlet and an outlet;
    the reformation catalyst disposed in the housing; and
    fuel tubes extending through the catalyst and configured to provide heat exchange between the fuel and the catalyst,
    wherein the low-temperature pre-reformer is configured such that the fuel flows from the inlet and through the fuel tubes in a first direction, and then flows through the catalyst in an opposing second direction before reaching the outlet.

5. The system of claim 1, wherein the reformation catalyst is configured to operate at a temperature ranging from about 250° C. to about 420° C. and the molecular hydrocarbon containing fuel includes at least one molecule selected from $CH_4$, $C_2H_6$, $C_2H_4$, $C_3H_8$, $C_3H_6$, n-$C_4H_{10}$, i-$C_4H_{10}$, $C_5H_{12}$, or $C_6H_{14}$.

6. The system of claim 4, wherein the reformation catalyst is a packed bed surrounding the fuel tubes or is a monolith including through holes in which the fuel tubes are disposed.

7. The system of claim 3, wherein the housing comprises:
    a first collection area disposed on a first side of the catalyst and configured to collect fuel from the fuel tubes and provide fuel to the catalyst; and
    a second collection area disposed on a second side of the catalyst and configured to collect fuel from the catalyst and provide fuel to the outlet.

8. The system of claim 1, further comprising a heater configured to heat fuel supplied to the low-temperature pre-reformer to a temperature sufficient to initiate a reformation reaction in the pre-reformer, wherein the heater comprises an inductive heater or a gas heater.

9. The system of claim 1, further comprising:
    a splitter configured to receive the anode exhaust from the anode recuperator;
    an anode exhaust cooler configured to receive the anode exhaust from the splitter; and
    a low-temperature heat exchanger configured to heat fuel provided to the low-temperature pre-reformer using the anode exhaust received from the splitter.

10. The system of claim 9, wherein the low-temperature heat exchanger is configured heat fuel supplied to the low-temperature pre-reformer to a temperature sufficient to initiate a reformation reaction in the a low-temperature pre-reformer.

11. The system of claim 9, further comprising a recycle valve configured to receive anode exhaust from the anode exhaust cooler and the low-temperature heat exchanger,
    wherein the recycle valve is configured to selectively control relative amount of anode exhaust provided from the splitter to the anode exhaust cooler and the low-temperature heat exchanger.

12. The system of claim 9, further comprising an air cooler configured to cool anode exhaust provided to the mixer.

13. The system of claim 9, further comprising an anode tail gas oxidizer configured to oxidize anode exhaust received from the splitter.

14. The system of claim 1, further comprising a high-temperature pre-reformer configured to partially reform fuel provided to the anode recuperator at a temperature of about 400° C. or more.

15. The system of claim 14, wherein the high-temperature pre-reformer is disposed inside of the anode recuperator.

16. The system of claim 14, wherein the high-temperature pre-reformer is disposed outside of the anode recuperator.

17. The system of claim 1, wherein the fuel cells in the fuel cell stack comprise solid oxide fuel cells.

18. The system of claim 1, wherein the reformation catalyst comprises a Ni/$Al_2O_3$ catalyst.

19. The system of claim 1, wherein the reformation catalyst comprises a Pt—Ni/$Al_2O_3$ catalyst.

20. The system of claim 1, wherein the reformation catalyst comprises a Ni—Cr catalyst.

* * * * *